United States Patent
Lu et al.

(10) Patent No.: US 7,010,409 B2
(45) Date of Patent: Mar. 7, 2006

(54) REFERENCE SIGNAL GENERATOR FOR AN INTEGRATED SENSING SYSTEM

(75) Inventors: Jianbo Lu, Livonia, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 176 days.

(21) Appl. No.: 10/762,405

(22) Filed: Jan. 22, 2004

(65) Prior Publication Data
US 2005/0080542 A1  Apr. 14, 2005

Related U.S. Application Data

(60) Provisional application No. 60/450,065, filed on Feb. 26, 2003.

(51) Int. Cl.
*B60T 7/12* (2006.01)
*G06F 19/00* (2006.01)

(52) U.S. Cl. .............................. 701/70; 701/48; 701/91
(58) Field of Classification Search .................... 701/1, 701/48, 70, 82, 91; 180/197
See application file for complete search history.

(56) References Cited

U.S. PATENT DOCUMENTS

| | | | | |
|---|---|---|---|---|
| 5,809,444 A | * | 9/1998 | Hadeler et al. | 701/72 |
| 6,393,351 B1 | * | 5/2002 | Frediani et al. | 701/69 |
| 6,450,281 B1 | * | 9/2002 | Kohler et al. | 180/197 |
| 2002/0016661 A1 | * | 2/2002 | Frediani et al. | 701/69 |
| 2004/0199300 A1 | * | 10/2004 | Gustafsson et al. | 701/1 |
| 2004/0249545 A1 | * | 12/2004 | Lu et al. | 701/70 |
| 2005/0080543 A1 | * | 4/2005 | Lu et al. | 701/70 |

* cited by examiner

*Primary Examiner*—Gary Chin
(74) *Attorney, Agent, or Firm*—Gary Smith

(57) ABSTRACT

A vehicle control system includes a sensor cluster within a housing generating a plurality of signals including a roll rate signal, a pitch rate signal, a yaw rate signal, a longitudinal acceleration signal, a lateral acceleration signal, and a vertical acceleration signal. An integrated controller includes a reference signal generator generating a reference lateral velocity signal as a function of a kinematics road constraint condition, a dynamic road constraint condition, and singularity removal logic, all of which are responsive to sensor cluster signals. A dynamic system controller receives the reference lateral velocity signal and generates a dynamic control signal in response thereto. A vehicle safety system controller receives the dynamic control signal and further generates a vehicle safety device activation signal in response thereto.

28 Claims, 3 Drawing Sheets

REFERENCE SIGNAL GENERATOR FOR AN INTEGRATED SENSING SYSTEM

CROSS-REFERENCE TO RELATED APPLICATIONS

The present invention is related to provisional application Ser. No. 60/450,065 entitled, "A REFERENCE SIGNAL GENERATOR USED IN THE INTEGRATED SENSING SYSTEM FOR AN AUTOMOTIVE VEHICLE," filed on Feb. 26, 2003 and incorporated by reference herein.

TECHNICAL FIELD

The present invention relates generally to a vehicle sensing system and, more specifically, to a reference signal generator for an integrated sensing system.

BACKGROUND

Various automotive vehicles have recently begun including vehicle control systems. Such vehicle control systems include yaw stability control systems, roll stability control systems, integrated vehicle dynamic control systems, etc. The ongoing goal of vehicle controls is to achieve a coordinated system level vehicle performances for ride, handling, safety and fuel economy.

With current advances in mechatronics, vehicle controls have increased opportunities for achieving performances, which were previously reserved for spacecraft and aircraft. For example, gyro sensors, previously only used in aircraft, have now been incorporated in various vehicle controls, and the anti-lock brake systems invented for airplanes are now standard automotive control systems. Current sensor technology generates ever increasing opportunities for vehicle control.

A typical vehicle control system utilizes 3-dimensional vehicle motions. For example, during yaw stability and roll stability controls, the control task involves three-dimensional motions along the vehicle roll, pitch, and yaw directions and along the vehicle longitudinal, lateral and vertical directions.

The coupling between different motion directions should not be neglected in most maneuvers involving vehicle roll over or vehicle yaw. For example, excessive steering of a vehicle will lead to excessive yaw and lateral motion, which may cause large rolling motion towards the outside of a turn. If the driver brakes the vehicle during the excessive steering, the vehicle will also experience roll and pitch motions in conjunction with lateral and longitudinal accelerations. Therefore, a successful vehicle dynamics control should involve an accurate determination of the vehicle roll, pitch and yaw attitude signals (side slip angle signal β).

Currently, inertial measurement units (IMUs) and various other sensors used in aerospace vehicle controls have been incorporated in automotive vehicles for inertial control. IMUs have been used in inertial navigation systems (INS) for aircrafts and satellites for decades. Typically, an INS system determines the attitude signal of a flight vehicle through IMU sensor signals.

An IMU sensor set includes three gyros and three linear accelerometers. An INS contains an IMU and a processor unit to compute the navigation solutions necessary for navigation, attitude-signal reference and various other data communication sources.

Although INS systems are sufficient to generate a navigation solution, over time the computation as a function of IMU sensor signals drifts, and the errors associated with the computation increases. Sometimes these errors increase such that a navigation solution is unattainable within the INS. To mitigate this problem and to compute a correct navigation solution over the entire flight, external navigation sources are used to continually correct the attitude signal computations as a function of IMU sensor signals. One of the more reliable of external sources is a GPS system with one or multiple GPS receivers. Such a system has been used to determine a rough attitude and velocity signal reference of a vehicle in flight.

Current automotive vehicle systems experience a similar signal drift problem in vehicle attitude and velocity signal determination. Although the drift is not as severe as in aerospace vehicles, it generates errors within the vehicle control system such that the vehicle control system engages improper actions.

It would therefore be desirable to determine reference signals, which function in place of GPS reference attitude and velocity signals used for correcting attitude signal computation in INS systems. In other words, it would be desirable to obtain reference attitude and velocity signals as functions of sensor signals but without using extra external sources like GPS.

SUMMARY OF THE INVENTION

In one aspect of the invention, a vehicle control system includes a sensor cluster within a housing generating a plurality of signals including a roll rate signal, a pitch rate signal, a yaw rate signal, a longitudinal acceleration signal, a lateral acceleration signal, and a vertical acceleration signal. An integrated controller includes a reference signal generator, the reference signal generator generating a reference lateral velocity signal as a function of a kinematics road constraint condition, a dynamic road constraint condition, and singularity removal logic. A dynamic system controller receives the reference lateral velocity signal and generates a dynamic control signal in response thereto. A vehicle safety system controller receives the dynamic control signal and further generates a vehicle safety device activation signal in response thereto.

In a further aspect of the invention, a method for controlling a safety device for a vehicle includes generating a reference lateral velocity signal as a function of a kinematics road constraint condition, a dynamic road constraint condition, and singularity removal logic; eliminating a singular point in a computation of the reference lateral velocity signal; generating a lateral velocity signal, a roll attitude signal, a pitch attitude signal, and a side slip angle signal as a function of a reference computational method including the kinematics road constraint; generating a lateral velocity signal and a reference side slip angle signal from the dynamic road constraint condition as functions of the kinematics road constraint; generating a dynamic control signal in response to the vehicle reference velocity signal (e.g. reference lateral velocity signal); and receiving the dynamic control signal and further generating a vehicle safety device activation signal in response thereto.

Thus, the present system may be incorporated in such systems as a rollover stability control system (RSC), a yaw stability control system, an ABS/TCS control system and a power-train control system for fuel economy purpose.

One advantage of the invention is that the sensor cluster in tandem with the integrated controller generates accurate vehicle attitude signal and velocity signals. More specific example is the vehicle longitudinal velocity. During braking or throttle conditions, the wheel speed signal alone would not be able to generate accurate vehicle reference speed (longitudinal velocity), which is used in wheel slip control for achieving RSC/TCS/ABS functions. When the wheels of one side of the vehicle are up in the air (due to large roll trending of the vehicle), those wheel speed information are no longer the valid indications of the vehicle speed. In off-road driving, more than one wheels could behave independently of the vehicle speed.

Another advantage is the substantially improved accuracy of current vehicle dynamics and predicted vehicle dynamics as used in but not limited to rollover stability control systems, yaw stability control systems, ABS/TCS control systems, power-train control systems.

Still a further advantage is the ability to identify the vehicle parameter changes. For example, the loading or mass variation of the vehicle could be identified so that appropriate level of control actions could be adjusted in proportional to the vehicle loadings.

Another advantage is the ability to detect the sensor misalignment errors and sensor plausibility check. The sensor misalignment errors have two portions (i) the sensor mounting errors; (ii) the uneven loading conditions generating misalignment between the loading vehicle and the unloading vehicle. Such an identification of the sensor misalignment errors could substantially improve the accuracy of the predicted vehicle operation states.

Another advantage is the ability to monitor and detect the potential abnormal states of the vehicle including, but not limited to, tire under-inflation, tire imbalance, and suspension wear, tire wear and tire misalignment.

Other objects and features of the present, invention will become apparent when viewed in light of the detailed description of the preferred embodiment and when taken in conjunction with the attached drawings and appended claims.

DESCRIPTION OF THE PREFERRED EMBODIMENT

Figure 1:
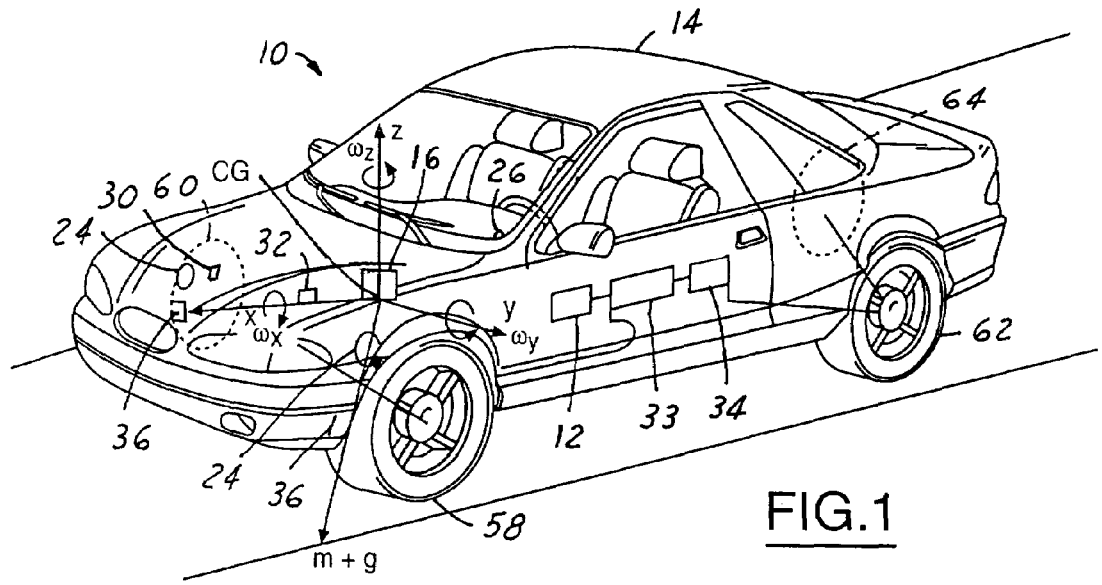
FIG. 1 is a diagrammatic view of a vehicle gin accordance with one-embodiment of the present invention.

In the following figures the same reference numerals will be used to identify the same components. The present invention is preferably used in conjunction with vehicle control systems, which include, but are not limited to a yaw stability control system, a roll stability control system, an integrated vehicle dynamics control system, or a total vehicle control system for achieving fuel economy and safety and other vehicle level performances.

The integrated system controller or integrated sensing system controller (ISS) in the present invention estimates and predicts the vehicle operation states including vehicle global and relative attitude signals, vehicle directional velocities, forces and torques applied to a vehicle, etc.; generates a sensor plausibility check; monitors the abnormal conditions of the moving vehicle; and corrects the sensor mounting errors of the sensors. The information generated from the integrated system controller is used to initiate control commands for various control systems including, but not limited to: power-train controls, brake controls, steering controls, transmission controls, suspension controls, etc. Additional controls include warnings to drivers of possible abnormal conditions such as: tire under inflation and unbalanced tires, on-line conditioning, and calibration of the errors in sensors due to mounting errors.

Figure 3:
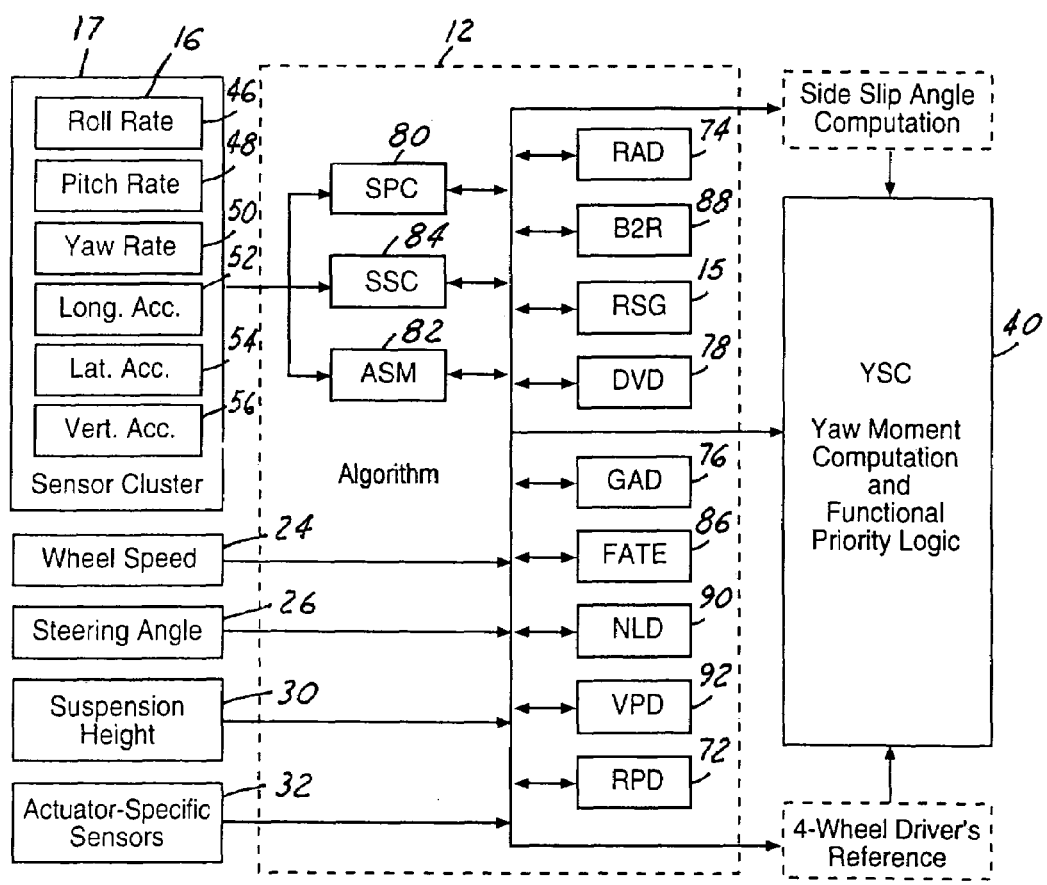
FIG. 3 is a diagrammatic view of a vehicle system in accordance with another embodiment of the present invention.
Figure 2:
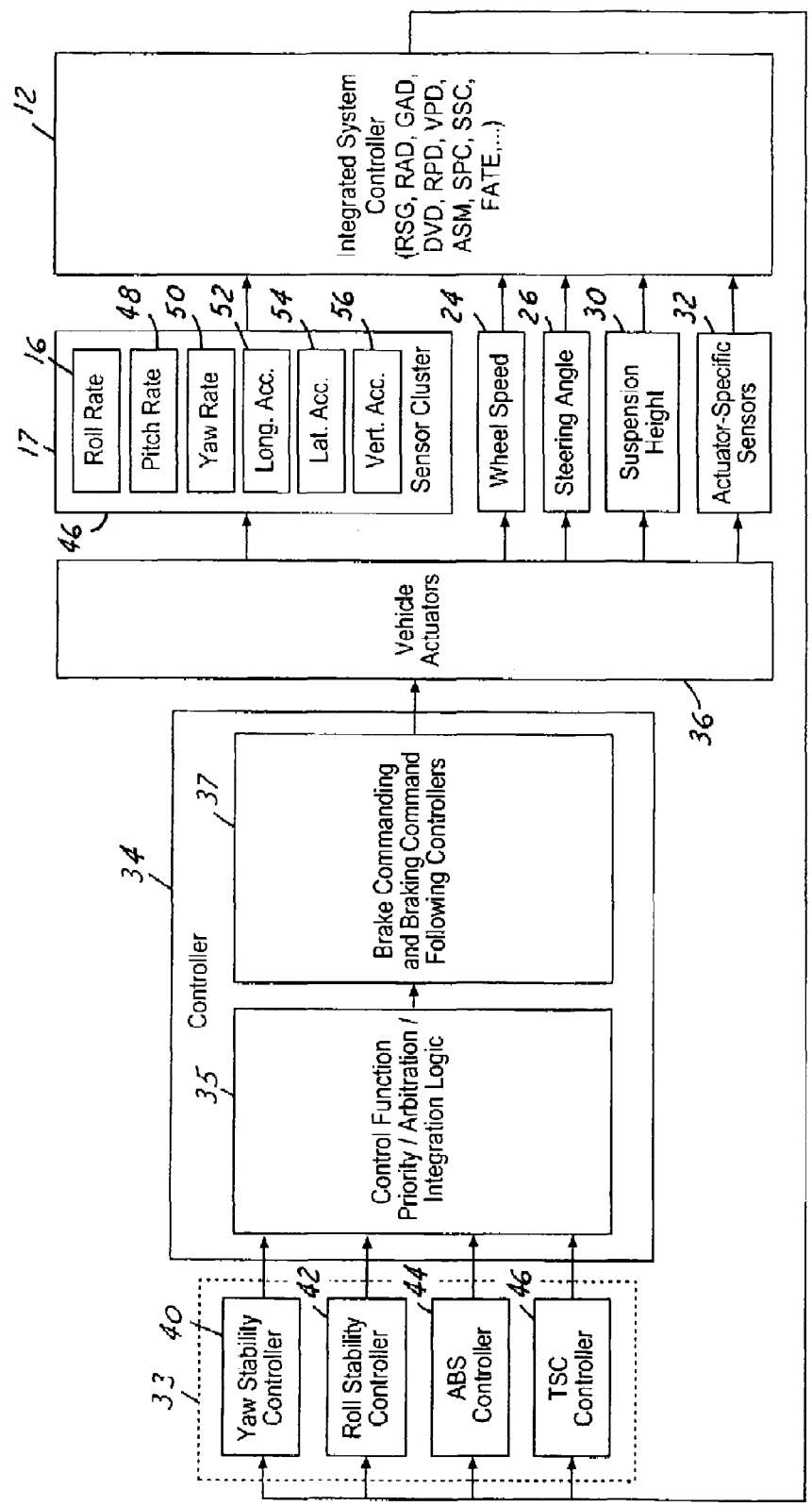
FIG. 2 is a diagrammatic view of a vehicle system in accordance with FIG. 1.

Referring to FIGS. 1, 2, and 3 a vehicle control system 10 for an automotive vehicle 14 having a controller (here embodied as the integrated system controller 12), having a reference signal generator 15 (RSG) (reference signal generator), is illustrated. The system 10 also includes a sensor cluster 16 or inertial measurement unit (IMU) sensor cluster within a housing 17, wheel speed sensors 24, steering angle sensors 26, suspension height sensors 30, local actuator sensors 32 used by the subsystem controls, a dynamic system controller 33, a braking controller 34 and various alternate vehicle actuators 36, all of which will be discussed in detail later.

The system components are connected in the following possible arrangement: the integrated system controller 12 is electrically coupled to the sensor cluster 16 and various other vehicle sensors 24, 26, 30, 32. Signals from the integrated system controller 12 are received in a dynamic system controller 33, including the yaw stability controller 40, the roll stability controller 42, the antilock braking system (ABS) controller 44, and the traction control system (TCS) controller 46. Signals from the dynamic system controller 33 are received in a braking controller 34 or vehicle safety system controller. Braking controller signals are received in vehicle and vehicle actuators 36, such as brake calipers and braking devices.

The integrated controller 12 includes sensing algorithms including but not limited to reference attitude signal and reference directional velocity determinations, global/relative attitude signal determination, directional velocity determination, sensor plausibility check, sensor signal conditioning, sensor error compensation, road profile, surface condition determination, vehicle parameter determination and abnormal state monitoring.

The integrated controller 12 includes various control units controlling the aforementioned sensing algorithms. These units may include: the reference signal generator 15 (RSG) (reference signal generator), which includes an attitude signal reference computation and a velocity reference computation, a road profile unit 72 (road profile determination unit (RPD)), an attitude signal unit or relative attitude signal determination unit 74 (RAD), a global attitude signal unit 76 (global attitude signal determination unit (GAD) and a directional unit 78 (directional velocity determination unit (DVD)), a sensor plausibility unit 80 (sensor plausibility check unit (SPC)), an abnormal state unit 82 (abnormal state monitoring unit (ASM)), a sensor signal compensating unit 84 (SSC), an estimation unit 86 (force and torque estimation unit (FATE)), a car body to fixed reference frame unit 88 (body to reference unit (B2R)), a normal load unit 90 (normal loading determination unit (NLD)), and a vehicle parameter unit 92 (vehicle parameter determination unit (VPD)). Signals generated from any one of the aforementioned units are referred to prediction of vehicle operation-states signals.

The integrated controller 12 receives a roll rate signal, a pitch rate signal, a yaw rate signal, a longitudinal acceleration signal, a lateral acceleration signal, and a vertical acceleration signal from the sensor cluster 16 and other signals from other vehicle sensors, and generates a vehicle reference velocity signal (e.g. a reference lateral velocity signal) and various other control signals in response thereto, such as an estimate of vehicle operation states signal and a prediction of vehicle operation states signal.

The system 10 includes the sensor cluster 16, wheel speed sensors 24, steering angle sensors 26, suspension height sensors 30, and local sensors 32 used by the subsystem controls. Such sensor sets cover almost all existing vehicle control functions. As an illustrative example, the yaw stability control 40 uses only a portion of the sensors from the system sensor set, such as those generating 4-wheel drive reference signals from the reference signal generator 15 and side slip angle signal computations from the directional unit 78.

The sensor cluster 16, within the housing 17, includes a roll rate sensor 46 generating a roll rate signal, a pitch rate sensor 48, generating a pitch rate signal, a yaw rate sensor 50 generating a yaw rate signal, a longitudinal acceleration sensor 52 generating a longitudinal acceleration signal, a lateral acceleration sensor 54 generating a lateral acceleration signal, and a vertical acceleration sensor 56 generating a vertical acceleration signal.

The sensor cluster 16 is mounted on the center of gravity of the vehicle 14 (or mounted on any location of the vehicle 14 that can be transformed into the center of gravity of the vehicle 14), the wheel speed sensors 24 are mounted at each corner of the vehicle 14, and the rest of the sensors are mounted on their respective locations in the vehicle 14.

As was previously mentioned, the sensor cluster 16 includes three gyros 46, 48, 50 and three linear accelerometers 52, 54, 56. The three gyros 46, 48, 50 and three linear accelerometers 52, 54, 56 in the sensor cluster 16 are calibrated and mounted along the vehicle body-fixed directions, x, y and z.

As those skilled in the art will recognize, the frame from x, y and z is referred to as a body frame, whose origin is located at the center of gravity of the car body, with the x pointing forward, y pointing off the driving side (to the left), and the z pointing upward. The angular rate outputs of the sensor cluster measure the car body angular rates along the body-fixed axes and are denoted about their respective axes as $\omega_x$ for the roll rate, $\omega_y$ for the pitch rate and $\omega_z$ for the yaw rate. The acceleration outputs from the sensor cluster 16 are measures of the car body directional accelerations along the body-fixed axes and are denoted about their respective axes as $a_x$ for longitudinal acceleration, $a_y$ for lateral acceleration and $a_z$ for vertical acceleration.

The wheel speed sensors 24 are mounted at wheel locations and are denoted as $w_{lf}$, $w_{rf}$, $w_{lr}$, $w_{rr}$ for left front 58, right-front 60, left-rear 62 and right-rear wheels 64 respectively.

The roll, pitch and yaw attitude signal angles of a vehicle 14 are related to the roll angular rate, pitch angular rate and yaw angular rate sensor signals through coupled interactions, rather than simple integrations and differentiations. Simple integrations work when the different motions of the vehicle 14 are decoupled. In general, complicated relationships exist among the vehicle attitude signals and the angular rates. If the vehicle roll, pitch and yaw attitude signal angles are respectively denoted as $\theta_x, \theta_y$ and $\theta_z$, then this complicated relationship can be expressed in the following functional relationship due to the Euler transformation.

$$\dot{\theta}_x = \omega_x + [\omega_y \sin(\theta_x) + \omega_{z3} \cos(\theta_x)] \tan(\theta_y)$$

$$\dot{\theta}_y = \omega_y \cos(\theta_x) - \omega_z \sin(\theta_x) \qquad (1)$$

$$\dot{\theta}_z = [\omega_y \sin(\theta_x) + \omega_z \cos(\theta_x)] \sec(\theta_y)$$

The relationship depicted in the above equation reveals complicated nonlinear functions. The above equation indicates a simple integration of the roll rate, i.e., $$\theta_x(t) = \int_0^t \omega_x(\tau) d\tau$$

will fail to provide an accurate estimation of the vehicle roll attitude signal used in vehicle dynamics control (for example in roll stability control). The above simple integration only provides accurate information about the roll attitude signal angle when (a) both the pitch and yaw rate of the vehicle are negligible, which means the vehicle is dominated by roll motion; (b) the roll attitude signal angle and yaw rate are negligible, the pitch attitude signal is limited; and, (c) the pitch attitude signal angle is negligible with non-extreme pitch and yaw rates. All those three driving conditions are not generally true when the vehicle is in an excessive maneuver, which triggers the vehicle dynamics controls. The simple integration of the pitch rate is:

$$\theta_y(t) = \int_0^t \omega_y(\tau) d\tau$$

which fails to provide an accurate estimation of the vehicle pitch attitude signal used in vehicle dynamics controls (for example used in roll stability control and hill decent control). This simple integration merely leads to accurate prediction of the pitch attitude signal if the roll attitude signal angle is negligible and the yaw rate is not extremely large.

The yaw attitude signal angle is obtained from simple integration of the yaw rate sensor if the pitch and roll attitude signal are negligible with non-extreme pitch rate.

The following is simultaneously true:

$$\dot{\theta}_x \approx \omega_x, \dot{\theta}_y \approx \omega_y,$$

if $\theta_x \approx 0$ and $\theta_y \approx 0$, or $\theta_x \approx 0$ and $\omega_z \approx 0$. That is, either the vehicle has small roll and pitch attitude signal angles, or the vehicle has a small roll attitude signal angle plus a small yaw rate. This contradicts with the purpose of using them in rollover and pitch-over detection, since both roll and pitch attitude signal angles are large, and vehicles usually experience combined roll, pitch and yaw motions.

A direct integration for (1) can be formulated to include the following:

$$\theta_x(k+1) = \theta_x(k) + \{\omega_x(k+1) + [\omega_y(k+1)\sin(\theta_x(k)) + \omega_z(k+1) \cos(\theta_x(k))]\tan(\theta_y(k))\}\Delta T$$

$$\theta_y(k+1) = \theta_y(k) + \{\omega_y(k+1)\cos(\theta_x(k)) - \omega_z(K+1)\sin(\theta_x(k))\}\Delta T$$

$$\theta_z(k+1) = \theta_z(k) + \{[\omega_y(k+1)\sin(\theta_x(k)) + \omega_z(k+1)\cos(\theta_x(k))] \sec(\theta_y(k))\}\Delta T \qquad (2)$$

where $\Delta T$ is the sampling time of the controller. This integration tends to drift due to sensor error and due to numerical computation error. Periodically, the attitude signals are required to be initialized to some reference signals, for example:

$$\theta_x(N) = \theta_{x\text{-}REF}(N)$$

$$\theta_y(N) = \theta_{y\text{-}REF}(N)$$

$$\theta_z(N) = \theta_{z\text{-}REF}(N)$$

for N to be chosen as the multiple of the periods or feeding the attitude signal error between the generated attitude signals and the reference signals:

$$\theta_x(k) - \theta_{x\text{-}REF}(k)$$

$$\theta_y(k) - \theta_{y\text{-}REF}(k)$$

$$\theta_z(k) - \theta_{z\text{-}REF}(k)$$

into a Kalman filter or an extended Kalman filter such that generated attitude signals converge to true attitude signals. In aerospace industry, such reference signals are usually obtained through the signals from a GPS system.

In the present, invention, reference attitude signals are obtained through a road constraint. The road constraint considered here is a function of the inference that, on average, the vehicle is driven on the road (which could be 3-dimensional), and that the vehicle contacts the road and does not have a large take-off velocity. This road constraint, the Kinematics Road Constraint (KRC), does not exclude the potential vehicle take-off velocity due to road unevenness (e.g., bumps) causing vehicle heave vibrations. The average vehicle heave velocity, however, is around zero; or the low frequency portion of the vehicle heave velocity is zero. This unique operating condition for automotive vehicles allows the preset invention to eliminate the need for external sources like GPS to calculate reference attitude signals.

From a dynamics point of view, the road constraint balances the vehicle tire forces on the average-road surface plane, which shall be referred to as the Dynamic Road Constraint (DRC). DRC combined with the aforementioned KRC provide unique operating conditions for automotive vehicles, which is a key for us to conduct reference signal computation without using additional external sources (in comparison with using GPS in an INS/IMU system).

Due to the road constraint, a reference attitude signal can be generated as a function of the aforementioned three accelerometer outputs and the three angular rate outputs from the sensor cluster, the vehicle reference velocity generated from the wheel speed signals, the steering angle, together with the vehicle dynamics model. Such computations are performed in a reference signal generator unit 15, which generates the reference signal therefrom. The vehicle reference velocities include longitudinal reference velocity, lateral reference velocity or a side-slip angle signal $\beta$ (relative yaw attitude signal).

The reference velocities and reference attitude signal angles are denoted as:

$v_{x\text{-}REF}$ = vehicle longitudinal reference velocity $v_{y\text{-}REF}$ = vehicle lateral reference velocity $v_{z\text{-}REF}$ = vehicle vertical reference velocity $\theta_{x\text{-}REF}$ = vehicle roll reference attitude $\theta_{y\text{-}REF}$ = vehicle pitch reference attitude $\theta_{z\text{-}REF}$ = vehicle yaw reference attitude where $v_{x\text{-}REF}, v_{y\text{-}REF}, v_{z\text{-}REF}$ characterize the x,y,z-directional velocities of center of gravity of the vehicle body in the body-fixed x,y,z-axes. $\theta_{x\text{-}REF}, \theta_{y\text{-}REF}, \theta_{z\text{-}REF}$ are the so-called Euler angles of the vehicle-body with respect to a level ground like sea level. $\theta_{x\text{-}REF}, \theta_{y\text{-}REF}, \theta_{z\text{-}REF}$ are also the global reference roll, pitch and yaw attitude signals.

$v_{x\text{-}REF}$ is generated from the wheel speed sensor signals, the steering angle, the yaw angular rate and other generated variables. Important to note is that the reference velocities and reference attitude signals are normally determined for antilock braking systems, traction control systems, yaw stability control, and roll stability control.

The road constraint assumption implies that:

$$v_{z\text{-}REF} = 0$$

around low frequencies. Hence only three reference signals $v_{y\text{-}REF}, \theta_{x\text{-}REF}, \theta_{y\text{-}REF}$ need to be generated. Therefore, the reference signal generator 15 contains a lateral reference velocity computation unit for, computing reference lateral velocity signal $v_{y\text{-}REF}$, a roll attitude signal reference computation unit for computing the reference roll attitude signal $\theta_{x\text{-}REF}$, a pitch attitude signal reference computation unit for computing the reference pitch attitude signal $\theta_{x\text{-}REF}$.

Since the vehicle longitudinal velocity can be obtained from the wheel speed sensors, there is no need to calculate a reference signal for $v_{x\text{-}REF}$, i.e., the vehicle speed generated in the ABS system or the traction control system or the yaw stability control system are used. For an automotive system, the global yaw attitude signal has no impact on vehicle motion. Therefore, the yaw attitude signal of the vehicle with respect to the path that the vehicle must follow is used. Such relative yaw attitude signal is the side-slip angle signal, which is further related to the lateral velocity signal of the vehicle.

Therefore, the applicable reference signals in the RSG unit 15 are the lateral directional reference velocity $v_{y\text{-}REF}$, the reference global roll attitude signal $\theta_{x\text{-}REF}$ and the reference global pitch attitude signal. $\theta_{y\text{-}REF}$, and the relative reference yaw attitude signal $\beta_{REF}$.

Reference signals should be obtained from the kinematics road constraint. The sensor signals from the three directional accelerometers and the three gyros in the IMU 16 operate as a function of the following kinematics:

$$a_{xs} = \dot{v}_x - \omega_{zs} v_y + \omega_{ys} v_z - g \sin(\theta_y)$$

$$a_{ys} = \dot{v}_y + \omega_{zs} v_x - \omega_{xs} v_z + g \sin(\theta_x)\cos(\theta_y) \quad (3)$$

$$a_{zs} = \dot{v}_z - \omega_{ys} v_x + \omega_{xs} v_y + g \cos(\theta_x)\cos(\theta_y)$$

for the vehicle true directional velocities and true attitude signals. For automotive applications, equation (3) can be further simplified as the following:

$$a_{xs} \approx \dot{v}_x - \omega_{zs} v_y + \omega_{ys} v_z - g \sin(\theta_y)$$

$$a_{ys} \approx \dot{v}_y + \omega_{zs} v_x - \omega_{xs} v_z + g \sin(\theta_y) \quad (4)$$

$$a_{zs} \approx \dot{v}_z - \omega_{ys} v_x + \omega_{xs} v_y + g$$

The KRC constraint implies that $v_z \approx 0$ and $\dot{v}_z \approx 0$, hence mathematically KRC includes the following conditions for the involved reference signals, hereinafter referred to as the KRC condition:

$$\omega_{zs} v_{y\text{-}REF} - g \sin(\theta_{y\text{-}REF}) = a_{xs} - \dot{v}_x$$

$$g\sin(\theta_{x-REF}) + \dot{v}_{y-REF} = a_{ys} - \omega_{zs}v_x \quad (5)$$

$$\omega_{xs}v_{y-REF} = a_{zs} + \omega_{ys}v_x - g$$

Because the lateral velocity signal already contains the gravity portion, the total lateral acceleration projected on the road surface will satisfy the following:

$$a_{y\text{-}road} = a_{ys}\cos(\theta_{x\text{-}relative}) - g\cos(\theta_{x\text{-}REF})\sin(\theta_{x\text{-}relative})$$
$$\approx a_{ys}\cos(\theta_{x\text{-}relative}) - g\sin(\theta_{x\text{-}relative}) \quad (6)$$

and the yaw rate signal around the axis perpendicular to the average road surface will satisfy:

$$\omega_{z\text{-}road} = -\omega_{xs}\sin(\theta_{y\text{-}relative}) + \omega_{ys}\sin(\theta_{x\text{-}relative})\cos(\theta_{y\text{-}relative}) + \omega_{zs}\cos(\theta_{x\text{-}relative})\cos(\theta_{y\text{-}relative}) \quad (7)$$

Along the average road surface, the wheel contacting road implies that all the forces must be balanced at the contact patches. Therefore, $$F_f = \frac{I_z\dot{\omega}_{z\text{-}road} - M_z + t_r M a_{y\text{-}road}}{t_f \cos(\delta)} \quad (8)$$

$$F_r = \frac{-I_z\dot{\omega}_{z\text{-}road} + M_z + t_f M a_{y\text{-}road}}{t_r}$$

where $F_f$ and $F_r$ are the lateral forces applied to the front axle and rear axle through tires respectively; $M_z$ is the yawing moment due to yaw stability control, which can be estimated as a function of the desired yaw stability command and the estimated road surface $\mu$; $I_z$ is the yaw momentum of inertia of the vehicle; M is the vehicle total mass; $t_f$ is the distance from the vehicle center of gravity to the front axle; $t_r$ is the distance from the vehicle center of gravity to the rear axle; $\delta$ is the steering angle at the front wheels. On the other hand, if the vehicle tires are contacting the road surface, the following is true:

$$F_f = C_f\left(\beta_{REF} + \frac{l_f\omega_{z\text{-}road}}{v_x} - \delta\right) \quad (9)$$

$$F_r = C_r\left(\beta_{REF} - \frac{l_r\omega_{z\text{-}road}}{v_x}\right)$$

Therefore, equation (9) is the DRC condition.

As a function of the KRC condition shown in (5), the reference signals can be generated as in the following:

$$v_{y\text{-}REF} = \frac{a_z + \omega_{ys}v_x - g}{\omega_{xs}} \quad (10)$$

$$\theta_{x\text{-}REF} = \sin^{-1}\left(\frac{a_{ys} - \omega_{zs}v_x - \dot{v}_{y\text{-}REF}}{g}\right)$$

$$\theta_{y\text{-}REF} = \sin^{-1}\left(\frac{-a_{xs} - \dot{v}_x - \omega_{zs}v_{y\text{-}REF}}{g}\right)$$

$$\beta_{REF} = \tan^{-1}\left(\frac{v_{y\text{-}REF}}{v_x}\right)$$

As a function of the DRC condition shown in (9), the reference signals can be obtained as in the following:

$$\beta_{REF} = \frac{l_r\omega_{z\text{-}road}}{v_x} + \frac{-I_z\dot{\omega}_{z\text{-}road} + M_z + t_f M a_{y\text{-}road}}{t_r C_r} \quad (11)$$

$$v_{y\text{-}REF} = v_x \tan(\beta_{REF})$$

Important to note is that the computation for reference lateral velocity signal is singular around $\omega_{xs}=0$. In order to eliminate such singularity, several remedy will be provided. The first remedy is due to the limit theorem, which says the following is true for continuous functions:

$$\lim_{\omega_{xs}\to 0} v_{y\text{-}REF} = \lim_{\omega_{xs}\to 0} \frac{\dot{a}_z + \dot{\omega}_{ys}v_x + \omega_{ys}\dot{v}_x}{\dot{\omega}_{xs}} \quad (12)$$

Therefore, the following logic for reference lateral velocity signal computation is generated:

if $|\omega_{xs}| > \varepsilon_1$ \quad (13)

$$v_{y\text{-}REF} = \frac{a_z + \omega_{ys}v_x - g}{\omega_{xs}}$$

else if $|\omega_{xs}| > \varepsilon_1$ & $|\dot{\omega}_{xs}| > \varepsilon_2$ $$v_{y\text{-}REF} = \frac{\dot{a}_z + \dot{\omega}_{ys}v_x + \omega_{ys}\dot{v}_x}{\dot{\omega}_{xs}}$$

else $$v_{y\text{-}REF} = 0$$

where $\epsilon_1$ and $\epsilon_2$ are two thresholds which are determined as a function of vehicle testing. In other words, when the vehicle has significant roll rate or roll rate velocity equation (10) can be used. Hence equations (10) and (13) are likely to cover a small window for reference lateral velocity. For cases where vehicle does not have significant roll motion, other methods may be required.

Considering that the reference signals in equation (11) obtained from DRC condition can be also used to remedy the singular point for equations (10), (13) is further expanded, as in the following to include small roll motion cases, for a given $\lambda<1$:

if $|\omega_{xs}| > \varepsilon_1$ \quad (14)

$$v_{y\text{-}REF} = \frac{a_z + \omega_{ys}v_x - g}{\omega_{xs}}$$

else if $|\omega_{xs}| \le \varepsilon_1$ & $|\dot{\omega}_{xs}| > \varepsilon_2$ $$a_{y\text{-}road} = a_{ys}\cos(\theta_{x\text{-}relative}) - g\sin(\theta_{x\text{-}relative})$$

$$\omega_{z\text{-}road} = -\omega_{xs}\sin(\theta_{y\text{-}relative}) +$$
$$\omega_{ys}\sin(\theta_{x\text{-}relative})\cos(\theta_{y\text{-}relative}) +$$
$$\omega_{zs}\cos(\theta_{x\text{-}relative})\cos(\theta_{y\text{-}relative})$$

$$\beta_{REF} = \frac{l_r\omega_{z\text{-}road}}{v_x} + \frac{-I_z\dot{\omega}_{z\text{-}road} + M_z + t_f M a_{y\text{-}road}}{t_r C_r}$$

$$v_{y\text{-}REF} = \lambda v_x \tan(\beta_{REF}) + (1-\lambda)\frac{\dot{a}_z + \dot{\omega}_{ys}v_x + \omega_{ys}\dot{v}_x}{\dot{\omega}_{xs}}$$

else

-continued $$a_{y\text{-}road} = a_{ys}\cos(\theta_{x\text{-}relative}) - g\sin(\theta_{x\text{-}relative})$$

$$\omega_{z\text{-}road} = -\omega_{xs}\sin(\theta_{y\text{-}relative}) +$$
$$\omega_{ys}\sin(\theta_{x\text{-}relative})\cos(\theta_{y\text{-}relative}) +$$
$$\omega_{zs}\cos(\theta_{x\text{-}relative})\cos(\theta_{y\text{-}relative})$$

$$\beta_{REF} = \frac{l_r\omega_{z\text{-}road}}{v_x} + \frac{-I_z\dot{\omega}_{z\text{-}road} + M_z + t_f M a_{y\text{-}road}}{t_r C_r}$$

$$v_{y\text{-}REF} = v_x\tan(\beta_{REF})$$

The reference signals generated from the reference signal generator 15 are generally accurate at low frequencies because the low frequency portion of the heave velocity of a vehicle body is almost zero. Hence the lower-pass filtered $v_{y\text{-}REF},\theta_{x\text{-}REF},\theta_{y\text{-}REF}$ matches the low frequency portion of the actual vehicle states of lateral velocity signal $v_y$, roll attitude signal $\theta_x$ and pitch attitude signal $\theta_y$. That is:

$$LPF_1[v_{y\text{-}REF}]=LPF_1[v_y]$$

$$LPF_2[\theta_{x\text{-}REF}]=LPF_2[v_x]$$

$$LPF_3[\theta_{y\text{-}REF}]=LPF_3[v_y] \quad (15)$$

$$LPF_4[\beta_{REF}]=LPF_4[\beta]$$

The low-pass-filters $LPF_1, LPF_2, LPF_3, LPF_4$ have various cut-off frequencies $\omega_{c1}, \omega_{c2}, \omega_{c3}, \omega_{c4}$ which are optimized and tuned as a function of the real data. Hence the above conditions will be used in Global Attitude signal Determination (GAD) Unit and Directional Velocity Determination (DVD) Unit of the ISS to calibrate and correct the actual computations for the true lateral velocity signal $v_y$, the roll attitude signal $\theta_x$ and the pitch attitude signal $\theta_y$ and the side-slip angle signal (relative yaw attitude signal) $\beta$.

In order to solve the nonlinear differential equations in real-time for the attitude signal angles $\theta_x$ and $\theta_y$, the simple numerical integration, as shown above, is generally not applicable because the sensor errors and numerical errors both tend to cause integration drift off, i.e., the integration errors increase over time. Therefore, the reference signals from the reference signal generator (RSG) are used. Important to note is that only the low frequency portion of the reference signals $v_{y\text{-}REF},\theta_{x\text{-}REF},\theta_{y\text{-}REF}$ are close to the true vehicle variables.

In order to reduce or eliminate pure-integration-induced drift; filters or anti-integration-drift filters (AID) are used for solving the nonlinear differential equations shown above. Such filters can be expressed as in the following for $2^{nd}$ order case:

$$T_{AID_i}(z^{-1}) = \frac{d_{i1}(1-z^{-2})}{1-c_{i1}z^{-1}+c_{i2}z^{-2}}$$

where i=1,2,3, $d_{i1},c_{i1},c_{i2}$ are the filter coefficients.

$\hat{\theta}_x$ is the generated vehicle attitude signal for roll attitude signal angle, $\hat{\theta}_y$ for pitch attitude signal angle, therefore the total roll and pitch velocities using the past estimated value of the vehicle attitude signals can be computed as in the following:

$$\Theta_{xvt}(k+1)=\omega_x(k+1)+[\omega_y(k+1)\sin(\theta_x(k))+\omega_z(k+1)\cos(\theta_x(k))]\tan(\theta_y(k))\Theta_{yvt}(k+1)=\omega_y(k+1)\cos(\theta_x(k))-\omega_z(k+1)\sin(\theta_x(k)).$$

Then the digital implementation of the filter can be expressed as the following for roll attitude signal:

$$\hat{\theta}_{x\text{-}dyn}(k+1)=c_{12}\hat{\theta}_{x\text{-}dyn}(k)-c_{22}$$
$$\hat{\theta}_{x\text{-}dyn}(k-1)+d_{12}[\Theta_{xvt}(k+1)-\Theta_{xvt}(k-1)]$$
$$\hat{\theta}_{x\text{-}dyn}(0)=\theta_{x0} \quad (16)$$

and for pitch attitude signal:

$$\hat{\theta}_{y\text{-}dyn}(k+1)=c_{13}\hat{\theta}_{y\text{-}dyn}(k)-c_{23}$$
$$\hat{\theta}_{y\text{-}dyn}(k-1)+d_{12}[\Theta_{yvt}(k+1)-\Theta_{yvt}(k-1)]$$
$$\hat{\theta}_{y\text{-}dyn}(0)=\theta_{y0}. \quad (17)$$

The previous two equations (16), (17) perform integrations but remove the potentially correct low frequency portion. Therefore, the useful low frequency portion should be recovered. Such recovery is possible due to the road constraint assumption, as was previously mentioned. If the low-pass-filters are chosen as the following for i=1,2,3;

$$LPF_i(z^{-1}) = \frac{e_{i1}+e_{i2}z^{-1}-e_{i3}z^{-2}}{1-c_{i1}z^{-1}+c_{i2}z^{-2}}$$

where the filter coefficients satisfying the following constraints:

$$e_{i1}=e_{i2}+e_{i3}$$

$$2e_{i2}=1-c_{i1}+c_{i2}$$

Then the low frequency portion of the reference variables are generated from the following digital schemes:

$$\hat{\theta}_{x\text{-}lpf}(k+1)=c_{12}\hat{\theta}_{x\text{-}lpf}(k)-c_{22}$$
$$\hat{\theta}_{x\text{-}lpf}(k-1)+e_{12}\theta_{x\text{-}REF}(k+1)+e_{22}\theta_{x\text{-}REF}(k)-e_{23}\theta_{x\text{-}REF}(k-1)$$
$$\hat{\theta}_{x\text{-}lpf}(0)=\theta_{x\text{-}REF0}$$

for low frequency roll attitude signal:

$$\hat{\theta}_{y\text{-}lpf}(k+1)=c_{13}\hat{\theta}_{y\text{-}lpf}(k)-c_{23}$$
$$\hat{\theta}_{y\text{-}lpf}(k-1)+e_{13}\theta_{y\text{-}REF}(k+1)+e_{23}\theta_{y\text{-}REF}(k)-e_{33}\theta_{y\text{-}REF}(k-1)$$
$$\hat{\theta}_{y\text{-}lpf}(0)=\theta_{y\text{-}REF0}$$

Therefore the roll and pitch attitude signal can be determined as in the following:

$$\hat{\theta}_x(k)=\hat{\theta}_{x\text{-}lpf}(k)+\hat{\theta}_{x\text{-}dyn}(k)$$

$$\hat{\theta}_y(k)=\hat{\theta}_{y\text{-}lpf}(k)+\hat{\theta}_{y\text{-}dyn}(k)$$

The above computations are performed at the attitude signal determination unit or global attitude signal unit 76, which generates the global attitude signal therefrom.

Determining vehicle lateral velocity signal can be conducted as a function of reference lateral velocity signal $\|_{y\text{-}REF}$, the lateral acceleration, the yaw rate, the steering angle, the past value of the generated roll and pitch attitude signals. The similar two-filter structure used previously herein is also required. This is performed at the directional unit or the directional velocity unit 78, which generates the directional velocity signal therefrom.

The relative attitude signals of the vehicle with respect to the average road surface can be:

$$\hat{\theta}_{x\text{-}relative}(k+1)=e_0\hat{\theta}_{x\text{-}relative}(k)+e_1[\Theta_x(k+1)+\Theta_x(k)]$$

$$\hat{\theta}_{y\text{-}relative}(k+1)=f_0\hat{\theta}_{y\text{-}relative}(k)+f_1[\Theta_y(k+1)+\Theta_y(k)]$$

where $$\Theta_x(k) = -a\dot{\omega}_x(k) + ba_y(k)$$

$$\Theta_y(k) = -g\dot{\omega}_y(k) - ha_x(k)$$

These computations are also performed in the attitude signal unit 74, which generates a relative attitude signal therefrom.

Since one of the angular rates can be estimated from the rest of the sensor signals in the sensor cluster 16, the generated variables, and the reference variables; the sensor plausibility can be checked within the controller. For example the pitch rate sensor can be estimated as:

$$\hat{a}\hat{c}_i\hat{0}\hat{\omega}\hat{a}\hat{c}\hat{x}_i[<a]\overline{cx_i}\hat{A}\hat{P}_y = \hat{a}\hat{c}_i\hat{0}\hat{\theta}\hat{a}\hat{c}\hat{x}_i[<a]\overline{cx_i}\hat{A}\hat{P}_y\sec(\hat{\theta}_x) + \omega_z\tan(\hat{\theta}_x)$$

Therefore by comparing the pitch rate sensor output with the above estimated pitch rate, pitch rate sensor plausibility can be conducted. The plausibility for roll rate sensor and yaw rate sensor can be similarly performed. Those are generated within the sensor, check unit or sensor plausibility unit 80, which generates a sensor plausibility signal therefrom.

Because of the relationships between the sensor signals, the sensor mounting errors can also be corrected within the controller 12. For example, the pitch misalignment of the sensor cluster can be calculated as in the following $$\Delta\theta_y = \sin^{-1}\left(\frac{\dot{v}_x}{\sqrt{A_x^2 + A_y^2}}\right) - \sin^{-1}\left(\frac{A_x}{\sqrt{A_x^2 + A_y^2}}\right)$$

where $$A_x = a_{xs} + \omega_{zs}v_y + g\sin(\theta_{ySH})$$

$$A_y = a_{zs} - \omega_{zs}v_y + g\cos(\theta_{ySH})$$

and $v_x$ and $v_y$ is the vehicle longitudinal and lateral velocities calculated on the road frame. For example, $v_x$ can be calculated based solely on the wheel speed signals, $v_y$ can be calculated based on a linear bicycle model of the vehicle. In this case, the above computation will be conducted conditionally: for example, the vehicle is driven straight with deceleration or acceleration.

Similar misalignment or mounting errors of the other sensors are also performed. The sensor information is then used to conduct real-time calibration for sensor signals. For example, the rolling radius calibration for wheel speed sensors can be performed as a function of the available sensor signals and the generated signals. Those computations are conducted at the sensor compensation unit or sensor signal unit 84, which generates a sensor compensation signal therefrom.

The sensors also provide information for estimating and predicting the road profile, the road surface and the road curvatures. Such computations are conducted in the road profile unit 72, which generates a road profile signal including but not limited to surface friction level, surface unevenness (roughness), road inclination and bank angle, therefrom.

The abnormal conditions of the vehicle are also detected and monitored in the system. These abnormal conditions include tire under-inflation, tire imbalance, tire wear, tire misalignment, actuator failure, wheel lifting, etc. Such functions are performed in an abnormal state unit or abnormal state monitoring unit 82, which generates the abnormal state signal as a function thereof.

The forces and torques applied to the wheels play important roles in many vehicle control functions. The system 10 also conducts estimation of and prediction of those loadings in an estimation unit or force and torque unit or force and torque estimation unit 86 (FATE), which generates the force and torque signal as a function thereof.

The reference attitude signal, generated as a function of all the sensor signals and the road constraint assumption, is used to correct the attitude signal computation errors.

In addition to the sensor cluster 16, the system 10 also includes wheel speed sensors 24, a wheel steering angle sensor 26, suspension height sensors, and any actuator specific sensors 32 e.g., the brake pressure sensors and all the other sensors, which are used for subsystem controls. Hence the system 10 generates the vehicle operation states, such as: vehicle attitude signals with respect to the average road surface, vehicle directional velocity, road profile and surface conditions, traction forces, and tire forces.

Another aspect of the system 10 is the ability to conduct sensor plausibility checks, sensor error compensation, and abnormal vehicle state monitoring and detection because all the sensor signals are available to the system 10. Many of the sensor signals have cross influences over other sensor signals, and there are interconnecting relationship among all the sensor signals.

Referring to FIG. 3, the dynamic system controller 33 receives the reference lateral velocity signal and generates a dynamic control signal in response as a function thereof. The dynamic system controller may include a yaw stability controller 40, a roll stability controller 42, an ABS controller 44, or a TCS controller 46, or any combination thereof either separate or together in a single dynamic system unit.

The braking system controller 34 or safety device controller/vehicle safety system receives the dynamic control signal and generates a braking signal in response thereto. The braking system controller 34 includes control function priority/arbitration/integration logic 35 and brake communicating and brake command controllers 37.

The braking system controller 34 receives at least-one of a plurality of signals including: the road-profile signal, the vehicle attitude signal, the global position signal, the vehicle direction signal, the sensor plausibility signal, the abnormal state signal, the mounting sensor error correction signal, and the force and torque signal. In one embodiment of the present invention, the braking system controller 34 checks the reference lateral velocity signal with the at least one of the plurality of signals. In alternate embodiments, the braking system controller 34 predicts future vehicle states from at least one of the aforementioned signals and activates safety devices in response thereto.

The various alternate known actuators 36 include active steering systems, active braking systems, active transmission systems, drive-train controls, power-train controls, throttle controls, controllable suspensions, controllable anti-roll-bar, etc. The actuators 36 are activated in response to the signals generated from the integrated system controller 12.

Figure 4:
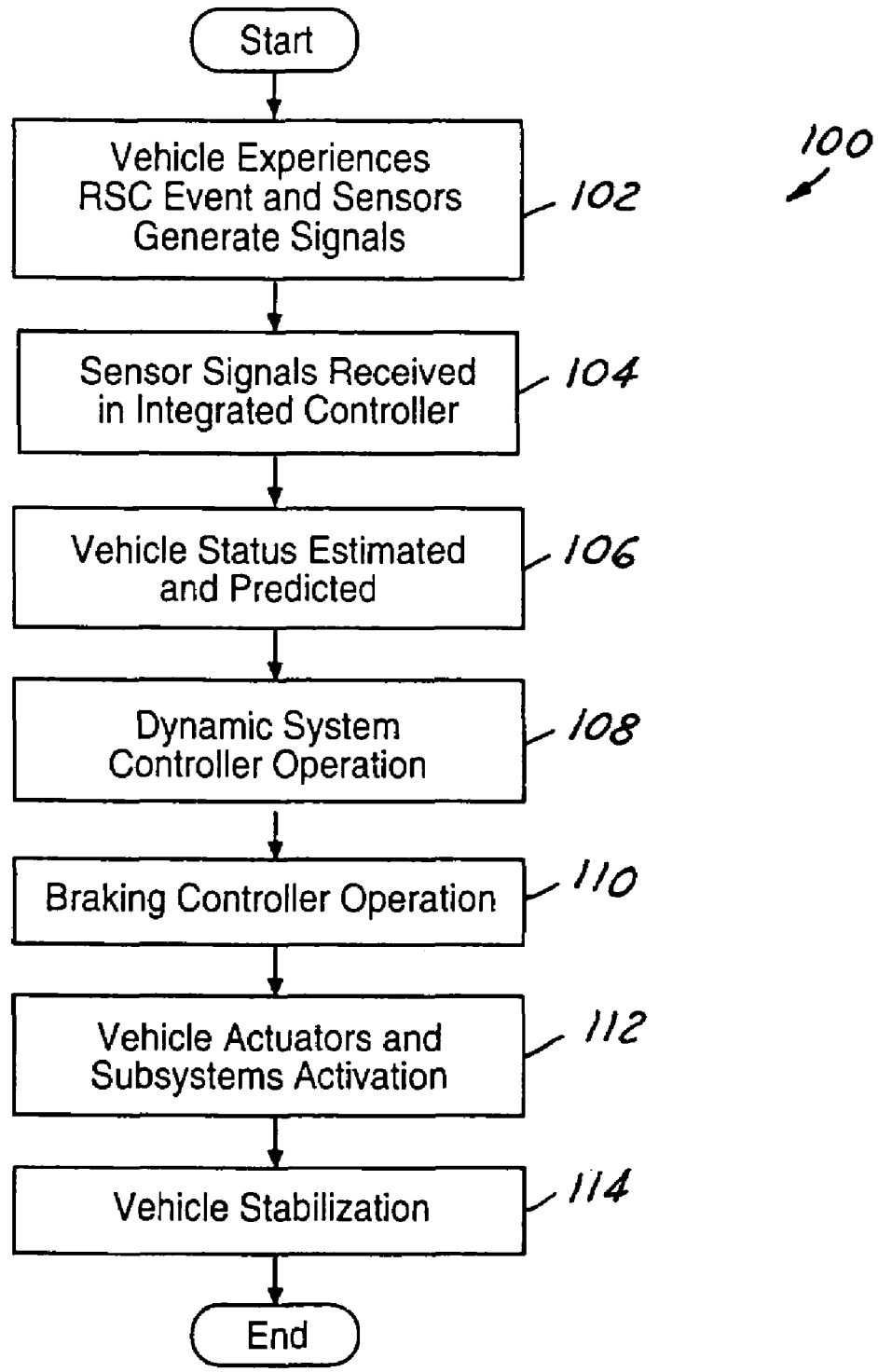
FIG. 4 is a logic flow diagram of a method for controlling a vehicle dynamic system in accordance with another embodiment of the present invention.

Referring to FIG. 4, a logic flow diagram 100 of a method for controlling a vehicle dynamic system, in accordance with another embodiment of the present invention, is illustrated. Logic starts in operation block 102, where the vehicle 14 experiences an RSC event. The sensors within the sensor cluster 16 respond to RSC event data by generating sensor signals, as was previously discussed. In operation block 104, the sensor cluster signals and various other vehicle sensor signals are received in the integrated system controller 12.

In operation block 106, the integrated system controller 12 estimates current vehicle states and reference velocities and predicts future vehicle states in response to the RSC generated sensor signals.

In operation block 108, a dynamic system controller 33 receives the integrated system controller signals and generates therefrom stability control signals.

In operation block 110, the braking controller 34 receives the dynamic system controller signals and generates therefrom braking signals. In response thereto, in operation block 112, vehicle actuators 36 and vehicle systems are activated to respond to or compensate for the RSC event. In operation block 114, the vehicle actuators 36 and systems compensate for the RSC event and attempt to stabilize the vehicle 14.

In, operation, a method for controlling a safety device for a vehicle includes generating a reference lateral velocity signal as a function of a kinematics road constraint condition, a dynamic road constraint condition, and singularity removal logic; eliminating a singular point in a computation of the reference lateral velocity signal; generating a lateral velocity signal, a roll attitude signal, a pitch attitude signal, and a side slip angle signal as a function of a reference computational method including the kinematics road constraint; generating a lateral velocity signal and a reference side slip angle signal from the dynamic road constraint condition as functions of the kinematics road constraint; generating a dynamic control signal in response to the reference lateral velocity signal; and receiving the dynamic control signal and further generating a vehicle safety device activation signal in response thereto.

The method also includes generating an attitude signal reference computation, generating a road profile signal, generating a vehicle attitude signal, generating a global position signal, generating a vehicle direction signal, generating a sensor plausibility signal, generating an abnormal state signal including information regarding abnormal vehicle conditions, generating a mounting sensor error correction signal, generating a force and torque signal in response to forces and torques applied to the vehicle, generating a body fixed frame to roll frame signal, generating a normal load signal, generating a vehicle parameter signal, and generating the safety device control signal in response to a combination of the attitude signal reference computation, the road profile signal, the vehicle attitude signal, the global position signal, the vehicle direction signal, the sensor plausibility signal, the abnormal state signal the mounting sensor error correction signal, and the force and torque signal.

While particular embodiments of the invention have been shown and described, numerous variations and alternate embodiments will occur to those skilled in the art. Accordingly, it is intended that the invention be limited only in terms of the appended claims.

What is claimed is:

1. A vehicle control system including a sensor cluster within a housing generating a plurality of signals including a roll rate signal, a pitch rate signal, a yaw rate signal, a longitudinal acceleration, signal, a lateral acceleration signal, and a vertical acceleration signal, the system comprising:
   an integrated controller comprising a reference signal generator, said reference signal generator generating a reference signal as a function of a kinematics road constraint condition, a dynamic road constraint condition, and singularity removal logic;
   a dynamic system controller receiving said reference signal and generating a dynamic control signal in response thereto; and
   a vehicle safety system controller receiving said dynamic control signal and further generating a vehicle safety device activation signal in response thereto.

2. A system as in claim 1, wherein said sensor cluster comprises at least three angular rate sensors and at least three linear acceleration sensors.

3. A system as in claim 1, wherein said integrated controller further comprises:
   at least one of a road profile unit generating a road profile signal,
   an attitude signal unit generating a vehicle attitude signal,
   a global attitude signal unit generating a global position signal,
   a directional unit generating a vehicle direction signal,
   a directional velocity unit generating a vehicle direction velocity signal,
   a sensor plausibility unit generating a sensor plausibility signal,
   an abnormal state unit generating an abnormal state signal including information regarding abnormal vehicle conditions,
   a sensor signal compensating unit generating a mounting, sensor error correction signal,
   a force and torque estimation unit generating force and torque signal in response to forces and torques applied to the vehicle,
   a car body to fixed body unit generating a body fixed to rollover fixed foam signal, or
   a normal loading unit generating a normal signal, and
   a vehicle parameter unit generating a vehicle parameter determination signal,
   wherein said integrated controller generates said reference signal from at least one of said attitude signal reference computation, said road profile signal, said vehicle attitude signal, said global position signal, said vehicle direction signal, said sensor plausibility signal, said abnormal state signal, said mounting sensor error correction signal, and said force and torque signal.

4. A system as in claim 1, wherein signals generated from said integrated controller initiate control commands for various control systems including at least one of yaw stability control, roll stability control, ABS control, traction control, slip control, power-train control, transmission control, drive-train control, suspension control, anti-roll-bar control, vehicle leveling control, fuel economy control, active safety, passive safety, emission control, tire under-inflation detection and monitoring, and tire imbalance monitoring and detection, sensor plausibility checks, sensor signal compensating, and sensor signal real-time calibration.

5. The system of claim 1, wherein said reference signal generator generates said reference signal, including at least one of a reference lateral velocity signal, a reference roll attitude signal, a reference pitch attitude signal, and a reference side slip angle signal, as a function of a reference computational method including said kinematics road constraint.

6. The system of claim 5, wherein said reference signal generator generates said reference side slip angle signal from said dynamic road constraint condition as a function of said kinematics road constraint.

7. The system of claim 5, wherein said singularity removal logic comprises a blending scheme generating said reference lateral velocity signal as a function of eliminating a singular point in a computation of said reference signal.

8. The system of claim 5, wherein said reference signal generator generates said reference lateral velocity signal as a function of said dynamic road constraint condition through logic projecting lateral vehicle accelerations along an average road surface in response to said lateral acceleration signal, said reference roll attitude signal, and said reference pitch attitude signal generated within said integrated controller.

9. The system of claim 5, wherein said reference signal generator projects a yaw rate signal along a vertical axis perpendicular to an average road surface using said roll rate signal, said pitch rate signal, said yaw rate signal, and relative roll and pitch attitude signals generated within said integrated controller,
   said reference signal generator generating said reference side slip angle signal as a function of said lateral acceleration signal and said yaw rate signal,
   said reference signal generator generating said reference lateral velocity signal as a function of said reference side slip angle signal.

10. The system of claim 5, wherein said reference signal generator generates said reference lateral velocity signal as a function of said vertical acceleration signal, said roll rate signal, said yaw rate signal, and a vehicle speed signal.

11. The system of claim 5, wherein said reference signal generator generates said reference roll attitude signal as a function of a differentiation of said reference lateral velocity signal, said pitch rate signal, said yaw rate signal, and a vehicle speed signal.

12. The system of claim 5, wherein said reference signal generator generates said reference pitch attitude signal as a function of said reference lateral velocity signal, said yaw rate signal, a differentiation of a vehicle speed, and said longitudinal accelerometer signal.

13. The system of claim 5, wherein said reference signal generator generates said reference side slip angle signal or a relative yaw attitude signal as a function of said reference lateral velocity signal and a vehicle speed signal.

14. The system of claim 1, wherein said singularity removal logic comprises eliminating a singular point in a computation of said reference signal through application of a limit theorem, such that when said roll rate signal is below a threshold, said reference signal generator generates said reference signal as a function of said limit theorem.

15. A control system for an automotive vehicle comprising:
   a housing;
   a sensor cluster within said housing comprising a plurality of angular rate sensors generating angular rate signals and a plurality of linear acceleration sensors generating linear acceleration signals, wherein said angular rate sensors and said linear acceleration sensors comprise an IMU;
   a wheel speed sensor generating a wheel speed signal corresponding to a wheel speed of the vehicle;
   a steering angle sensor generating a steering angle signal;
   an integrated controller receiving said angular rate signals, said linear acceleration signals, said wheel speed signal, and said steering angle signal, said integrated controller generating a lateral velocity signal, a roll attitude signal, a pitch attitude signal, and a side slip angle signal as functions of a reference computational method comprising a kinematics road constraint, said angular rate signals, said linear acceleration signals, said wheel speed signal, and said steering angle signal;
   a vehicle dynamic controller receiving said lateral velocity signal, said roll attitude signal, said pitch attitude signal, and said side slip angle signal and generating a dynamic control signal in response thereto; and
   a dynamic stability control system receiving said dynamic control signal and operating a safety device in response thereto.

16. A system as in claim 15, wherein said vehicle dynamic controller controls vehicle control objectives including at least one of yaw stability control, roll stability control, ABS control, traction control, slip control, power-train control, transmission control, drive-train control, suspension control, anti-roll-bar control, vehicle leveling control, fuel economy control, active safety, passive safety, and emission control, and
   wherein said vehicle dynamic controller controls vehicle abnormal state monitoring including at least one of tire under-inflation detection and monitoring, tire imbalance monitoring and, detection, excessive suspension wearing, and
   wherein said vehicle dynamic controller conducts at least one of a sensor plausibility check, sensor signal compensation, and sensor signal real-time calibration.

17. The system as in claim 15, wherein said integrated controller further generates a sensor plausibility check.

18. The system as in claim 15, wherein said integrated controller further monitors the abnormal conditions of the vehicle in motion.

19. The system as in claim 15, wherein said integrated controller further corrects sensor mounting errors of said sensor cluster with respect to a body of said vehicle.

20. A vehicle system having an IMU sensor cluster including at least three angular rate sensors and at least three linear acceleration sensors, said sensor cluster generating vehicle dynamic signals including a roll rate signal, a yaw rate signal, a pitch rate signal, a longitudinal acceleration signal, a lateral acceleration signal, and a vertical acceleration signal, the system comprising:
   an integrated controller comprising a reference signal generator, said reference signal generator generating a reference lateral velocity signal as a function of a kinematics road constraint condition, a dynamic road constraint condition, and singularity removal logic, said singularity removal logic computing said reference lateral velocity signal as a function of eliminating a singular point in a computation of said reference lateral velocity signal,
   said integrated controller generating a lateral velocity signal, a roll attitude signal, a pitch attitude signal, and a side slip angle signal as a function of a reference computational method including said kinematics road constraint,
   said integrated controller generating said lateral velocity signal and a reference side slip angle signal from said dynamic road constraint condition as functions of said kinematics road constraint condition,
   said singularity removal logic comprising a blending scheme computing said reference lateral velocity signal as a function of eliminating a singular point in a computation of said reference lateral velocity signal,
   said reference signal generator generating said reference lateral velocity signal as a function of said dynamic road constraint condition through logic projecting lateral vehicle accelerations along an average road surface in response to said lateral acceleration signal, a relative roll attitude signal, and a relative pitch attitude signal generated within said integrated controller,
   said reference signal generator projecting said yaw rate signal along a vertical axis perpendicular to an average road surface using said relative roll and pitch attitude signals generated within said integrated controller, said reference signal generator generating said reference side slip angle signal as a function of the lateral acceleration signal and the yaw rate signal, said reference signal generator generating said reference lateral velocity signal as a function of said side slip angle signal;

a dynamic system controller receiving said reference lateral velocity signal and generating a dynamic control signal in response thereto; and a vehicle safety system controller receiving said dynamic control signal and further generating a vehicle safety device activation signal in response thereto.

21. The system of claim 20, wherein said singularity removal logic comprises:

eliminating a singular point in said computation of said reference lateral velocity signal through application of a limit theorem, such that when the roll rate signal is below a threshold, said reference signal generator generates said reference lateral velocity signal as a function of said limit theorem.

22. A method for controlling a safety device for a vehicle comprising:

generating a reference lateral velocity signal as a function of a kinematics road constraint condition, a dynamic road constraint condition, and singularity removal logic for eliminating a singular point in a computation of said reference lateral velocity signal;

generating said reference lateral velocity signal, a reference roll attitude signal, a reference pitch attitude signal, and a reference side slip angle signal as a function of a reference computational method including limitations of said kinematics road constraint;

generating said reference lateral velocity signal and said reference side slip angle signal from said dynamic road constraint condition as functions of said kinematics road constraint;

generating a dynamic control signal in response to said reference lateral velocity signal; and receiving said dynamic control signal and further generating a vehicle safety device activation signal in response thereto.

23. The method of claim 22 further comprising generating said reference lateral velocity signal as a function of said dynamic road constraint condition through logic projecting lateral vehicle accelerations along an average road surface in response to a lateral acceleration signal, a relative roll attitude signal, and a relative pitch attitude signal all generated within said integrated controller.

24. The method of claim 22 further comprising projecting a yaw rate signal along a vertical axis perpendicular to an average road surface using a roll rate signal, a pitch rate signal, a yaw rate signal and relative roll and pitch attitude signals generated within said integrated controller.

25. The method of claim 22 further comprising generating said reference side slip angle signal as a function of the lateral vehicle accelerations and a yaw rate signal.

26. The method of claim 22 further comprising generating said reference lateral velocity signal as a function of a side slip angle signal.

27. A method for controlling a safety device for a vehicle comprising:

generating a roll rate signal;

generating a pitch rate signal;

generating a yaw rate signal;

generating a longitudinal acceleration signal;

generating a lateral acceleration signal;

generating a vertical acceleration signal;

generating a reference lateral velocity signal as a function of said roll rate signal, said pitch rate signal, said yaw rate signal, said longitudinal acceleration signal, said lateral acceleration signal, and said vertical acceleration signal, a kinematics road constraint condition, a dynamic road constraint condition, and singularity removal logic, said singularity removal logic computing said reference lateral velocity signal as a function of eliminating a singular point in a computation of said reference lateral velocity signal;

generating said reference lateral velocity signal, a reference roll attitude signal, a reference pitch attitude signal, and a reference side slip angle signal as a function of a reference computational method including said kinematics road constraint;

generating a lateral velocity signal and said reference side slip angle signal from said dynamic road constraint condition as functions of said kinematics road constraint;

generating said reference lateral velocity signal as a function of said dynamic road constraint condition through logic projecting lateral vehicle accelerations along an average road surface in response to said lateral acceleration signal, a relative roll attitude signal, and a relative pitch attitude signal generated within said integrated controller;

projecting a yaw rate signal along a vertical axis perpendicular to an average road surface using said roll rate signal, said pitch rate signal, said yaw rate signal and said relative roll and pitch attitude signals generated, within said integrated controller;

generating said reference side slip angle signal as a function of said lateral acceleration signal and said yaw rate signal;

generating said reference lateral velocity signal as a function of said reference side slip angle signal;

generating a dynamic control signal in response to said reference lateral velocity signal; and controlling a vehicle safety device in response to said safety device control signal.

28. A method as in claim 27, wherein said controlling said vehicle safety device further comprises controlling yaw stability control, roll stability control, ABS control, traction control, slip control, power-train control, transmission control, drive-train control, suspension control, anti-roll-bar control, vehicle leveling control, fuel economy control, active safety, passive safety, and emission control, wherein said controlling said vehicle safety device further comprises controlling vehicle abnormal state monitoring, including: tire under-inflation detection and monitoring, tire imbalance monitoring and detection.

* * * * *